US007792363B2

(12) United States Patent
Foss

(10) Patent No.: US 7,792,363 B2
(45) Date of Patent: Sep. 7, 2010

(54) USE OF LEVEL DETECTION WHILE CAPTURING AND PRESENTING TEXT WITH OPTICAL CHARACTER RECOGNITION

(76) Inventor: Benjamin Perkins Foss, 165 Peralta Ave., #4, San Francisco, CA (US) 94110

( * ) Notice: Subject to any disclaimer, the term of this patent is extended or adjusted under 35 U.S.C. 154(b) by 41 days.

(21) Appl. No.: 11/729,663

(22) Filed: Mar. 28, 2007

(65) Prior Publication Data

US 2007/0230748 A1 Oct. 4, 2007

Related U.S. Application Data

(60) Provisional application No. 60/811,316, filed on Jun. 5, 2006, provisional application No. 60/788,365, filed on Mar. 30, 2006.

(51) Int. Cl.
*G06K 9/00* (2006.01)

(52) U.S. Cl. ..................................................... 382/187

(58) Field of Classification Search ....................... None
See application file for complete search history.

(56) References Cited

U.S. PATENT DOCUMENTS

| | | | | |
|---|---|---|---|---|
| 4,386,843 | A * | 6/1983 | Seedhouse | 399/216 |
| 5,794,196 | A | 8/1998 | Yegnanarayanan et al. | |
| 5,875,428 | A | 2/1999 | Kurzweil et al. | |
| 5,970,448 | A | 10/1999 | Goldhor et al. | |
| 5,999,903 | A | 12/1999 | Dionne et al. | |
| 6,014,464 | A | 1/2000 | Kurzweil et al. | |
| 6,033,224 | A | 3/2000 | Kurzweil et al. | |
| 6,052,663 | A | 4/2000 | Kurzweil et al. | |
| 6,125,347 | A | 9/2000 | Cote et al. | |
| 6,137,906 | A | 10/2000 | Dionne | |
| 6,173,264 | B1 | 1/2001 | Kurzweil et al. | |
| 6,199,042 | B1 | 3/2001 | Kurzweil | |
| 6,243,503 | B1 | 6/2001 | Teufel et al. | |

(Continued)

FOREIGN PATENT DOCUMENTS

EP 1022608 A1 * 7/2000

(Continued)

OTHER PUBLICATIONS

U.S. Appl. No. 11/729,662, filed Oct. 4, 2007.

(Continued)

*Primary Examiner*—Vikkram Bali
*Assistant Examiner*—Elisa M Rice
(74) *Attorney, Agent, or Firm*—Morgan, Lewis & Bockius LLP; Gary M. Gex

(57) ABSTRACT

A system for presenting text found on an object. The system comprises an object manipulation subsystem configured to position the substantially planar object for imaging; an imaging module configured to capture an image of the substantially planar object; a text capture module configured to capture text from the image of the substantially planar object; an Optical Character Recognition ("OCR") component configured to convert the text to a digital text; a material context component configured to associate a media type with the text found on the substantially planar object; and an output module configured to convert the digital text to an output format, wherein the system is configured to organize the digital text according to the media type before converting the digital text to an output format.

27 Claims, 8 Drawing Sheets

U.S. PATENT DOCUMENTS

| | | | | |
|---|---|---|---|---|
| 6,246,791 | B1 | 6/2001 | Kurzweil et al. | |
| 6,289,121 | B1 * | 9/2001 | Abe et al. | 382/175 |
| 6,320,982 | B1 | 11/2001 | Kurzweil et al. | |
| 6,512,539 | B1 | 1/2003 | Dance et al. | |
| 6,587,583 | B1 | 7/2003 | Kurzweil et al. | |
| 7,123,292 | B1 * | 10/2006 | Seeger et al. | 348/218.1 |
| 7,188,770 | B2 * | 3/2007 | Zhu et al. | 235/462.22 |
| 2003/0063335 | A1 * | 4/2003 | Mandel et al. | 358/498 |
| 2003/0086615 | A1 * | 5/2003 | Dance et al. | 382/200 |
| 2003/0195749 | A1 * | 10/2003 | Schuller | 704/258 |
| 2004/0046874 | A1 * | 3/2004 | Tse | 348/224.1 |
| 2004/0143430 | A1 * | 7/2004 | Said et al. | 704/2 |
| 2005/0071167 | A1 * | 3/2005 | Levin et al. | 704/272 |
| 2005/0276570 | A1 * | 12/2005 | Reed et al. | 386/46 |
| 2005/0286743 | A1 * | 12/2005 | Kurzweil et al. | 382/114 |

FOREIGN PATENT DOCUMENTS

WO PCT/US2007/065528 10/2007

OTHER PUBLICATIONS

U.S. Appl. No. 11/729,664, filed Dec. 6, 2007.

U.S. Appl. No. 11/729,665, filed Oct. 4, 2007.

Kurzweil, The Kurzweil-National Federation of the Blind Reader, pamphlet, (no date), 2 pages, (no vol-issue), K-NFB Reading Technology, USA, available at http://www.knfbreader.com.

Stanford University Libraries, Report on the Status of Digitization Facilities and Services for Bound Library Materials, web page, May 7, 2003, 8 pages, (no vol-issue), (no publisher), USA, available at http://www-sul.stanford.edu/depts/diroff/DLStatement.html.

Wizcom Technologies Ltd., InfoScan, web page, (no date), 1 page, (no vol-issue), (no publisher), USA, available at http://www.wizcomtech.com.

Kirtas Technologies, Inc., Free The Printed Word From The Books That Bind It, web page, (no date), 3 pages, (no vol-issue), (no publisher), USA, available at http://www.kirtas-tech.com.

International Search Report of International Application No. PCT/US07/65528 (mail date Jun. 10, 2008).

Office Action of U.S. Appl. No. 11/729,662 (mail date May 13, 2008).

Office Action of U.S. Appl. No. 11/729,664 (mail date of Jun. 3, 2008).

Office Action of U.S. Appl. No. 11/729,665 (mail date of May 28, 2008).

* cited by examiner

USE OF LEVEL DETECTION WHILE CAPTURING AND PRESENTING TEXT WITH OPTICAL CHARACTER RECOGNITION

RELATED APPLICATIONS

This application claims the benefit of Provisional Patent Application No. 60/811,316, filed Jun. 5, 2006, which is incorporated by reference herein in its entirety.

This application claims the benefit of Provisional Patent Application No. 60/788,365, filed Mar. 30, 2006, which is incorporated by reference herein in its entirety.

This application is related to U.S. patent application Ser. No. 11/729,662, filed Mar. 28, 2007 entitled "System for Capturing and Presenting Text Using Video Image Capture for Optical Character Recognition," which application is incorporated by reference herein in its entirety.

This application is related to U.S. patent application Ser. No. 11/729,664, filed Mar. 28, 2007 entitled "Method for Capturing and Presenting Text Using Video Image Capture for Optical Character Recognition," which application is incorporated by reference herein in its entirety.

This application is related to U.S. patent application Ser. No. 11/729,665, filed Mar. 28, 2007 entitled "Method for Capturing and Presenting Text While Maintaining Material Context During Optical Character Recognition," which application is incorporated by reference herein in its entirety.

TECHNICAL FIELD

The disclosed embodiments relate generally to the field of adaptive technology designed to help people with certain impairments and to augment their independence. More particularly, the disclosed embodiments relate to systems that assist in processing text into audible sounds for use by those suffering from dyslexia, low vision, or other impairments that make reading a challenge.

BACKGROUND

Modern society relies heavily on analog text-based information to transfer and record knowledge. For a large number of people, however, the act of reading can be daunting if not impossible. Such people include those with learning disabilities (LD), blindness, and other visual impairments arising from diabetic retinopathy, cataracts, age-related macular degeneration (AMD), and glaucoma, etc.

Recent studies indicate that at least one in twenty has dyslexia, a common form of LD and at least one in ten is affected with other forms of LD that limit a person's ability to read or write symbols. LDs are genetic neurophysiological differences that affect a person's ability to perform linguistic tasks such as reading and spelling. The disability can exhibit different symptoms with varying degrees of severity in different individuals. The precise cause or pathophysiology of LDs such as dyslexia remains a matter of contention and, to date, no treatment to reverse the condition fully has been found. Typically, individuals with LD are placed in remedial programs directed to modifying learning in an attempt to help such individuals read in a conventional manner. While early diagnosis is key to helping LD individuals succeed, the lack of systematic testing for the disability leaves the condition undetected in many adults and children. For the most part, modern approaches to LD have been taken from an educational standpoint, in the hopes of forcing LD-affected people to learn as others do. Such approaches have had mixed results because LD is physiologically-based. Sheer will or determination is not enough to rewire the brain and level the playing field. The disclosed embodiments address this problem by providing an alternative approach to assisting LD-affected individuals.

In addition to the LD population, there is a large and growing population of people with poor or no vision. Many of these are elderly people and the affected populations will increase in the next twenty years as Baby Boomers reach their 70s and beyond. According to the National Institutes of Health (2004), many individuals have conditions that either impair or threaten to impair vision, e.g., diabetic retinopathy, cataracts, advanced or intermediate AMD, and glaucoma. See table below for statistics. Additionally, 3.3 million people are blind or have low vision from other causes. The inability to read or reading suffered by these groups can have a devastating impact on these individuals' daily life. For example, difficulties in reading can interfere with performance of simple tasks and activities, and deprive affected individuals of access to important text-based information, independence, and associated self-respect. As such, there is a need for technology that can help the LD population gain ready access to text-based information.

| | Diabetic Reti-nopathy | Cataract | Advanced AMD | Inter-mediate AMD | Glaucoma |
|---|---|---|---|---|---|
| Number Affected | 4,725,220 | 20,475,000 | 1,749,000 | 7,311,000 | 2,218,000 |

The disclosed embodiments are designed to meet at least some of the needs of LD populations and of populations with low or no vision.

SUMMARY

One aspect of the invention involves a system for presenting text found on a substantially planar object. The system comprises: an object manipulation subsystem configured to position the substantially planar object for imaging; an imaging module configured to capture an image of the substantially planar object; a text capture module configured to capture text from the image of the substantially planar object; an Optical Character Recognition ("OCR") component configured to convert the text to a digital text; a material context component configured to associate a media type with the text found on the substantially planar object; and an output module configured to convert the digital text to an output format, wherein the system is configured to organize the digital text according to the media type before converting the digital text to an output format.

Another aspect of the invention involves a system for capturing text found on an object. The system comprises: an object manipulation module configured to position the object for imaging; an imaging module configured to image the object; a text capture module configured to capture a text from the image of the object; an OCR component configured to convert the text from the object to a digital text; and a material context component configured to organize the digital text to maintain a text layout on the object.

Another aspect of the invention involves a system for capturing text found on a non-planar object. The system comprises: an object manipulation module configured to position the non-planar object for imaging; an imaging module configured to capture a text from the non-planar object; and an OCR component configured to convert the text to a digital text.

Another aspect of the invention involves a system for capturing text found on an object. The system comprises: a page turning component configured to manipulate the object; a framing component configured to position the object; a light configured to enhance contrast on the object; a focusing component configured to generate a crisp image; an image capture component configured to generate an image of the object; a conversion component configured to convert the image to an OCR suitable image; an image composition component configured to process the OCR suitable image to create a composition page scan; an image conditioning component configured to create a conditioned image; an OCR component configured to convert the conditioned image to a digital text, wherein the digital text is stored in a first data structure; a material context component configured to organize the first data structure to retain the layout of the text on the object; a storage component configured to store the first data structure as a first stored digital text; a librarian component configured to manage access to the first stored digital text from the storage component; and a housing configured to contain the page turning component, the framing component, the light, the image capture component, the conversion component, the image composition component, the image conditioning component, the OCR component, and the material context component.

Another aspect of the invention involves a feature where the material context component is further configured to associate a layout format with the media type.

Another aspect of the invention involves a feature where the material context component is further configured to evaluate the media type and layout format to determine the layout of text found on the object.

Another aspect of the invention involves a feature where an image enhancement module prepares the environment for imaging the substantially planar object.

Another aspect of the invention involves a feature where the output format is selected from the group consisting of speech, Braille, and displaying large print text.

Another aspect of the invention involves a feature where the text capture module is further configured to capture text from a plurality of the images.

Another aspect of the invention involves a feature where an output module is configured to convert the digital text to an output format.

Another aspect of the invention involves a feature where the text capture module is further configured to capture text from a plurality of the images.

Another aspect of the invention involves a feature where the output module is further configured to translate the digital text.

Another aspect of the invention involves a feature where the output format is a language different than the text found on the object.

Another aspect of the invention involves a feature where the output module is further configured to display a first output format and emit a second output format as speech.

Another aspect of the invention involves a feature where the output module is further configured to synchronize the first output format with the second output format.

Another aspect of the invention involves a feature where the output module is further configured to emphasize text of the first output format as corresponding text in the second output format is spoken.

Another aspect of the invention involves a feature where a data module is configured to manage the digital text for subsequent access.

Another aspect of the invention involves a feature where a data module is configured to manage access to the digital text.

Another aspect of the invention involves a feature where an output module is configured to convert the digital text to an output format.

Another aspect of the invention involves a feature where the output module is further configured to translate the digital text.

Another aspect of the invention involves a feature where the output format is a language different than the text found on the non-planar object.

Another aspect of the invention involves a feature where the output format is selected form the group consisting of speech, Braille, and displaying large print text.

Another aspect of the invention involves a feature where the output format is speech and displayed as printed text.

Another aspect of the invention involves a feature where a housing is further configured to contain the storage component.

Another aspect of the invention involves a feature where the housing is further configured to contain the librarian component.

Another aspect of the invention involves a feature where an output component is configured to convert the first stored digital text to an output format.

DETAILED DESCRIPTION

This disclosure describes methods, systems, apparatuses, and graphical user interfaces for capturing and presenting text using auditory signals. Reference is made to certain embodiments of the invention, examples of which are illustrated in the accompanying drawings. While the invention is described in conjunction with the embodiments, it should be understood that it is not intended to limit the invention to these particular embodiments alone. On the contrary, the invention is intended to cover alternatives, modifications and equivalents that are within the spirit and scope of the invention as defined by the appended claims Moreover, in the following description, numerous specific details are set forth to provide a thorough understanding of the present invention. It will be apparent to one of ordinary skill in the art, however, that the invention may be practiced without these particular details. In other instances, methods, procedures, and components that are well-known to those of ordinary skill in the art are not described in detail to avoid obscuring aspects of the present invention.

According to certain embodiments, a system is provided to allow text from a document or other object to be read by the system to a person.

System Overview

Figure 1:
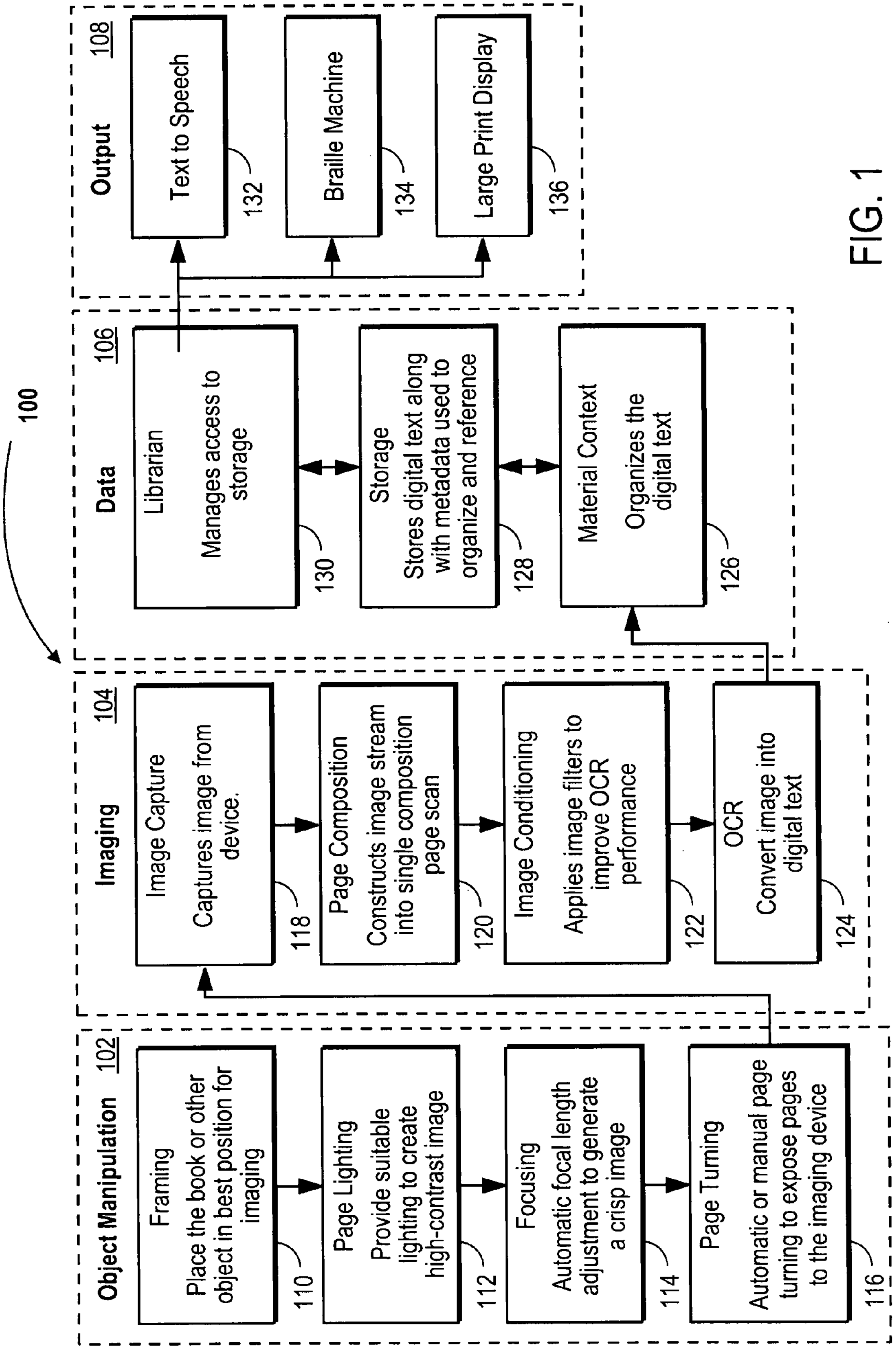
FIG. 1 provides a high-level overview of certain embodiments of the invention.

FIG. 1 provides a high-level overview of certain embodiments of the invention. The system of FIG. 1 comprises an object manipulation subsystem 102, an imaging subsystem 104, a data subsystem 106, and an output subsystem 108.

Subsystems 102-108 include components that are implemented either in software, hardware or a combination of software and hardware. Object manipulation subsystem 102 includes functional components such as framing 110, page lighting 112, focusing 114, and page turning 116. Imaging subsystem 104 includes functional components such as image capture 118, page composition 120, image conditioning 122, and OCR 124. Data subsystem 106 includes functional components such as material context 126, storage 128, and librarian 130. Output subsystem 108 includes functional components such as text-to-speech 132, Braille machine 134, large print display 136 and a translator (not shown).

Framing component 110 aids in positioning the book or other object to enable a camera component of the embodiment to obtain a suitable image of a page of the book or the surface of the object. A guiding mechanism may be used to position the book or other object. Non-limiting examples of guiding mechanisms include mechanical page guides and light projection as further described below with reference to page lighting component 112.

Page lighting component 112 ensures that optimal lighting is used in order to obtain a high-contrast (or other appropriate contrast) image. As a non-limiting example, an LCD light source that is integrated into the system may be used to provide suitable lighting. For colored images, page lighting 112 may optimally provide light in the natural spectrum, for example. Additionally, the light projection provided by page lighting component 112 can act as a framing guide for the book or other object by laying down a light and shadow image to guide placement of the book relative to the image finder of the imaging device.

Focusing component 114 provides automatic adjustment of focal length for generating a crisp image. For example, for optical character recognition ("OCR") applications, a high f-stop is desirable. Thus, focusing component 114 adjusts the focal length to a high f-stop value for generating images on which OCR is to be applied. Focusing component 114 may include a macro focusing feature for close-up focusing. According to certain embodiments, focusing can be achieved either manually or automatically. In the case of automatic focusing, computer software or computer hardware or a combination of computer software and hardware may be used in a feedback loop with the imaging subsystem 104 to achieve the desired focusing.

Page turning component 116 includes an automatic page turner for automatically turning the page for exposing each page of a book to an imaging device in the system for obtaining an image of the exposed page. According to certain embodiments, page turning component 116 may include a semi-automatic page turner by which a user may choose to turn a page by pressing a button. Page turning component 116 is synchronized with the imaging subsystem 104 such that the imaging subsystem 104 has new-page awareness when a page is turned to a new page. In response to the new page, the imaging subsystem 104 captures an image of the new page. Lighting and focal length adjustments may be made for each new page. Page turning component 116 enables automatic digitization of a book, magazine or other printed material. Thus, a user can place the book in the device and allow the device to run unattended for a specified period of time. At a later time, the user can return to collect the digitized version of the content of the book. The digitized content can be transferred to another personal device, if desired, and/or converted into a different data format, such as MP3 or another audio file format. The ability to frame, turn pages and organize content without user input is an important aspect of certain embodiments.

Figure 6:
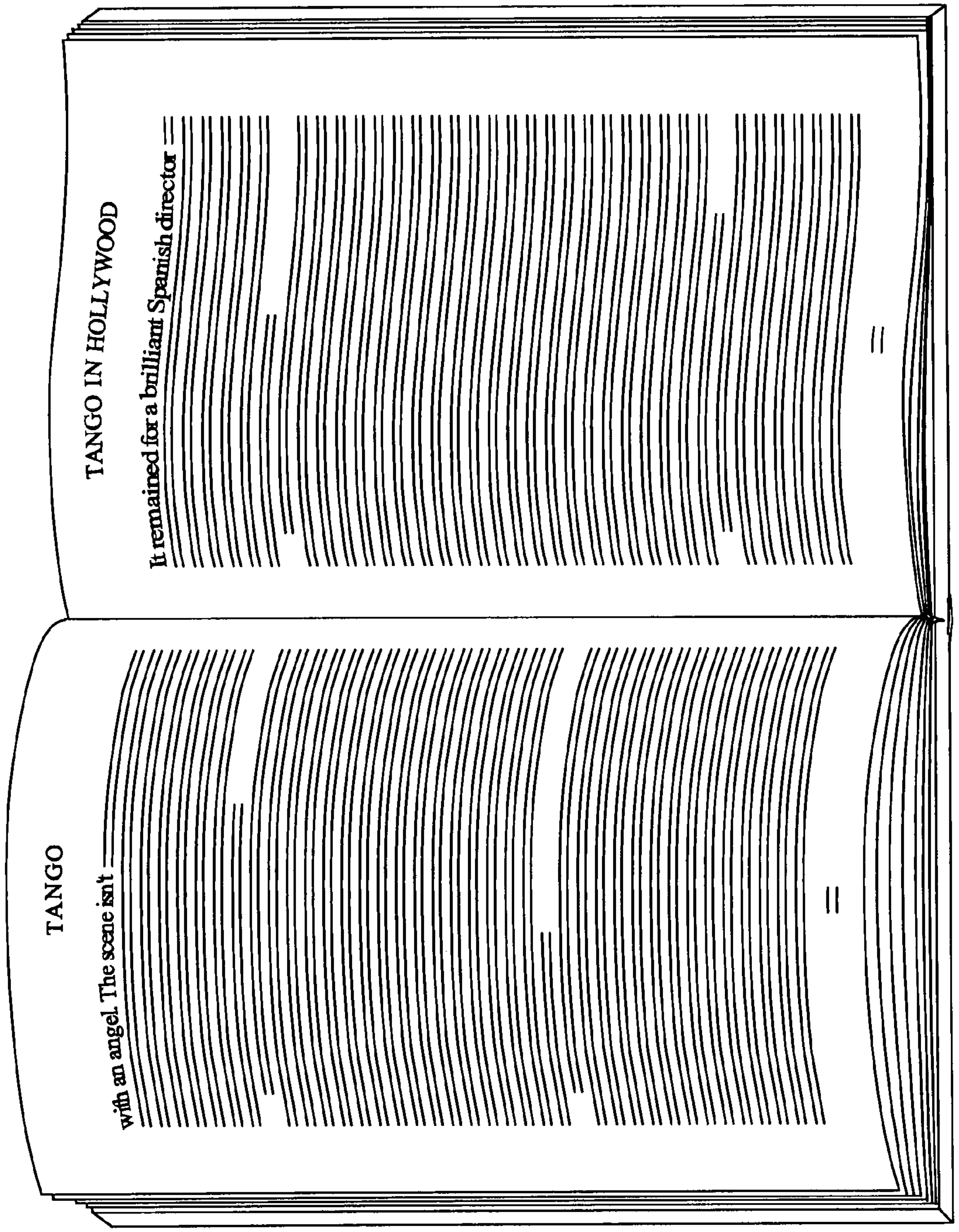
FIG. 6 shows a sample page of a book containing black text against a white background that can be captured and/or processed by an exemplary embodiment of the invention.

Image capture component 118 captures the image of a page or other object and converts the image to a format suitable for OCR. As a non-limiting example, image capture component 118 can capture an image photographically and then convert the captured image to a bit map. As another non-limiting example, image capture component 118 can capture streaming video and convert the streaming video into a consolidated image. Image capture component 118 may be configured automatically to cause rotation of the imaging device to account for surface curvature of a given page; substantially planar objects have little surface curvature, while non-planar objects have greater surface curvature on their surfaces. One example that will make this concept readily apparent is FIG. 6, whose pages are depicted in a non-planar configuration. Image capture component 118 includes image processing software for selecting the best images. The imaging device associated with the image capture component may comprise multiple variable focal length lenses.

Page composition component 120 processes the captured image by finding the different parts of a page for construction into a single composition page scan. Page composition component 120 recognizes the logical delineation between different articles in a magazine, for example, and can differentiate between pictures and text on the page. Further, page composition component 120 determines font size, page mode, special page profile, etc. For example, a magazine page mode informs that a page includes sections of various articles organized by columns. An example of a special page profile is the page profile of the Wall Street Journal printed newspaper.

Image conditioning component 122 applies image filters to the captured image for improving OCR performance. For example, image conditioning component 122 may boost the contrast of various parts of the page based on the colors of such parts. Further, image conditioning component 122 may include a feedback loop with page lighting component 112 and focusing component 114 for optimization of the image conditioning process.

OCR component 124 converts the conditioned image to digital text. OCR component 124 includes several engines to account for the nature of the text and/or the nature of the client. As a non-limiting example, special engines may be needed to handle legal, medical, and foreign language text. Different engines may be needed for creating different versions of digital text depending on the processing power available on the system. A thin or light version can be created for platforms with limited processing power, for example.

Material context component 126 organizes the data structures associated with the digital text into the appropriate form for a given media type so as to maintain a text layout which corresponds to the text on the object. For example, in the context of a book media type, the data structures are organized to correspond to the layout format for a book, i.e., chapters with footnotes. In the case of a magazine media type, the data structures are organized to correspond to the layout format for articles. In the case of a label for a medical prescription media type, the OCR component may tag key elements of the text as "doctor name" or "hospital phone number" for subsequent use by search functions. Further, material context component 126 has the ability to organize the data structures based on a set of predefined context profiles which relate to the layout formats of varying media types. According to certain embodiments, material context component 126 may be configured to learn a profile based on user behavior.

Storage component 128 stores the digital text along with the associated metadata used for organizing and referencing the digital text. Such data can be stored in memory associated with the system in any suitable format known in the art. The memory employed in the embodiments includes any suitable type of memory and data storage device. Some examples include removable magnetic media or optical storage media, e.g., diskettes or tapes, which are computer readable memories.

Librarian component 130 manages access to the stored digital text. Librarian component 130 provides one or more functionalities such as browsing, sorting, bookmarking, highlighting, spell checking, searching, and editing. Librarian component 130 may optionally include a speech enabled word analyzer with access to a thesaurus and a plurality of dictionaries including legal, medical, chemical, and engineering dictionaries, for example.

The user can choose to output the digital text in various forms. For example, text to speech component 132 can be used to convert the digital text to speech. The Braille machine 134 can be used to convert the digital text to Braille. The user has the option of converting the digital text to a format for large print display by using the display component 136. Further, according to certain embodiments, the user has the option of translating the digital text to a different language for outputting as speech, Braille or large print.

As described in greater detail herein, certain embodiments include a housing, an image capturing system, and a memory. In some embodiments, the housing includes a mechanism which enables the device to be worn by a user. Any mechanism, e.g., belt clip, wrist band, etc., known in the art may be employed for this purpose. In some embodiments, the housing frame is designed to fit a user in the form of a visor.

System Features

The imaging subsystem is configured to capture a text-based image digitally for subsequent OCR processing. As used herein, the term "capture" or "capturing" refers to capturing a video stream or photographing an image and is to be distinguished from scanning. The distinctions between video processing, photographing and scanning are clear and readily known to one of ordinary skill in the art, but for clarity, scanning involves placing the printed material to be recorded flat against a glass surface or drawing a scanning device across the surface of a page. Advantages associated with capturing a text-based image via digital photography, as opposed to scanning, include greater ease of use and adaptability. Unlike with a scanner, the imaging device need not be placed flush against the surface to be imaged, thereby allowing the user the freedom and mobility to hold the imaging device at a distance from said surface, e.g., at a distance that is greater than a foot from the page of a book. Thus, such an imaging device is adaptable enough for imaging uneven surfaces such as a pill bottle or an unfolded restaurant menu, as well as substantially planar surfaces such as a street sign. Accordingly, some embodiments of the invention can capture images from both planar and non-planar objects. Capturing the image in such a manner allows for rapid acquisition of the digital images and allows for automated or semi-automated page turning.

In the case of difficult-to-scan items such as a pill bottle, software modules associated with the imaging subsystem condition the less-than-scanning-perfect image for OCR processing. Thus, the user has the flexibility of using the device under a wide range of conditions.

According to certain embodiments, the imaging subsystem includes a power source, a plurality of lenses, a level detection mechanism, a zoom mechanism, a mechanism for varying focal length, a mechanism for varying aperture, a video capture unit, such as those employed in closed-circuit television cameras, and a shutter. The power source may be a battery, A/C, solar cell, or any other means known in the art. In some embodiments of the invention, the battery life extends over a minimum of two hours. In other embodiments, the battery life extends over a minimum of four hours. In yet other embodiments, the battery life extends over a minimum of ten hours.

To optimize the quality of the captured image, certain embodiments include a level detection mechanism that determines whether the imaging device is level to the surface being imaged. Any level detection mechanisms known in the art may be used for this purpose. The level detection mechanism communicates with an indicator that signals to the user when the device is placed at the appropriate angle (or conversely, at an inappropriate angle) relative to the surface being imaged. The signals employed by the indicator may be visual, audio, or tactile. Some embodiments include at least one automatically adjustable lens that can tilt at different angles within the device so as to be level with the surface being imaged and compensate for user error.

To avoid image distortion at close range, some embodiments include a plurality of lenses, one of which is a MACRO lens, as well as a zoom mechanism, such as digital and/or optical zoom. In certain embodiments, the device includes a lens operating in Bragg geometry, such as a Bragg lens. Embodiments can include a mechanism for varying the focal length and a mechanism for varying the aperture within predetermined ranges to create various depths of field. The image subsystem is designed to achieve broad focal depth for capturing text-based images at varying distances from the imaging device. Thus, the device is adaptable for capturing objects ranging from a street sign to a page in a book. The minimum focal depth of the imaging device corresponds to an f-stop 5.6, according to certain embodiments. In some embodiments, the imaging device has a focal depth of f-stop 10 or greater.

In certain embodiments, the imaging device provides a shutter that is either electrical or mechanical, and further provides a mechanism for adjusting the shutter speed within a predetermined range. In some embodiments, the imaging device has a minimum shutter speed of 1/60ths. In other embodiments, the imaging device has a minimum shutter speed of 1/125ths. Certain embodiments include a mechanism for varying the ISO speed of the imaging device for capturing text-based images under various lighting conditions. In some embodiments, the imaging device includes an image stabilization mechanism to compensate for a user's unsteady positioning of the imaging device.

In addition to the one-time photographic capture model, some embodiments further include a video unit for continuous video capture. For example, a short clip of the image can be recorded using the video capture unit and processed to generate one master image from the composite of the video stream. Thus, an uneven surface, e.g., an unfolded newspaper which is not lying flat, can be recorded in multiple digital video images and accurately captured by slowly moving the device over the surface to be imaged. A software component of the imaging subsystem can then build a final integrated composite image from the video stream for subsequent OCR processing to achieve enhanced accuracy. Similarly, a streaming video input to the imaging subsystem can be processed for subsequent OCR processing. Software that performs the above described function is known in the art. Accordingly, both planar and non-planar objects can be imaged with a video unit employing continuous video capture.

Additionally, some embodiments include one or more light sources for enhancing the quality of the image captured by the device. Light sources Known in the art can be employed for such a purpose. For example, the light source may be a FLASH unit, an incandescent light, or an LED light. In some embodiments, the light source employed optimizes contrast and reduces the level of glare. In one embodiment, the light source is specially designed to direct light at an angle that is not perpendicular to the surface being imaged for reducing glare.

In some embodiments, the image capturing system further includes a processor and software-implemented image detectors and filters that function to optimize certain visual parameters of the image for subsequent OCR processing. To optimize the image, especially images that include colored text, for subsequent OCR processing, some embodiments further include a color differential detection mechanism as well as a mechanism for adjusting the color differential of the captured image.

Figure 7:
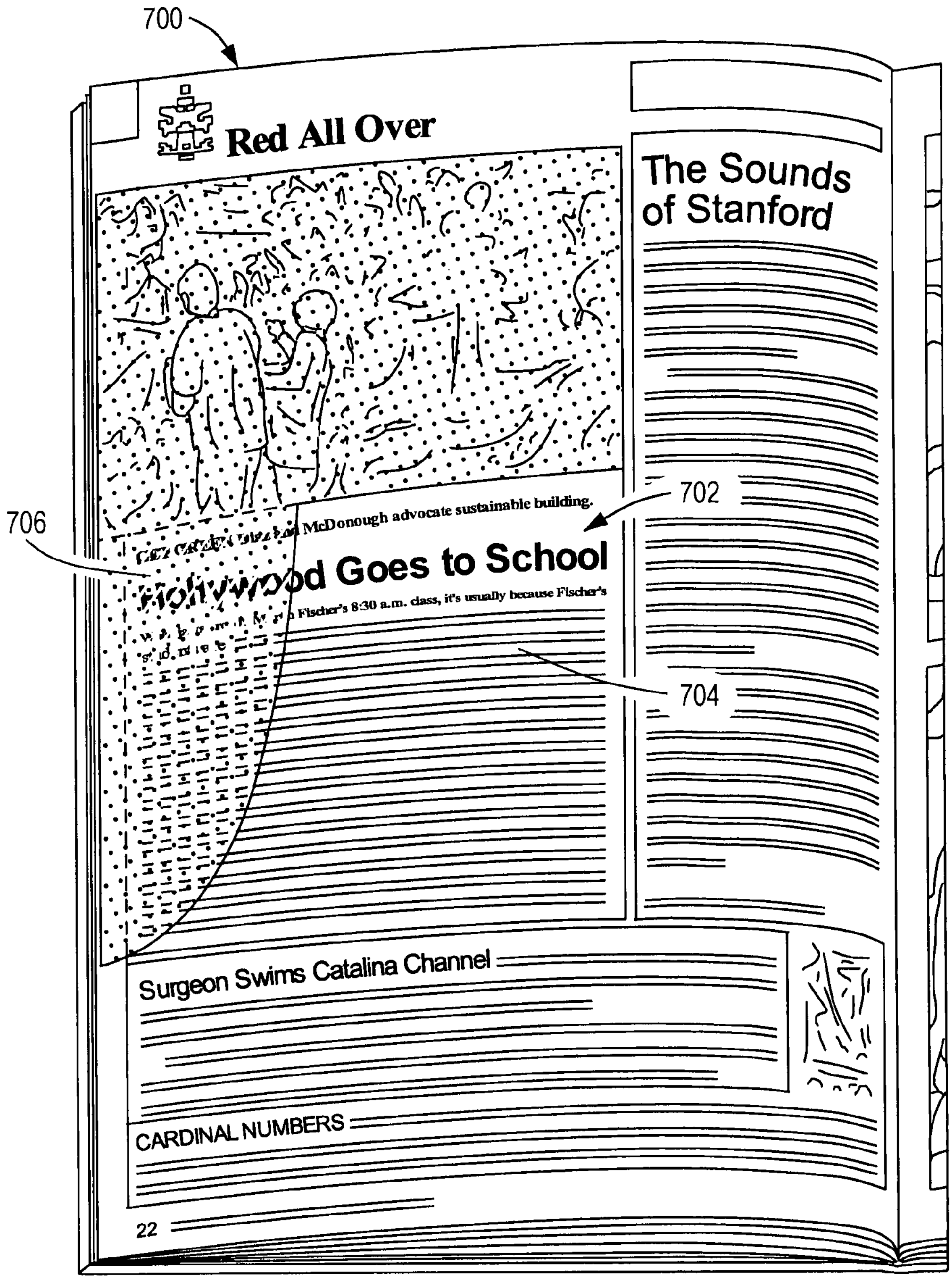
FIG. 7 shows a sample page of a colored magazine article that can be captured and/or processed by an exemplary embodiment of the invention.

As an example, FIG. 7 shows a page 700 where a given region 702 on the page contains text. Region 702 has two subregions. Subregion 704 has no background color, while subregion 706 has a background color. The text in region 702 spans both subregions 704 and 706. The contrast between the background color in subregion 706 and the text within subregion 706 is too low to allow for accurate OCR processing of all of region 702. To compensate for the poor contrast, the color differential detection mechanism of certain embodiments obtains information for determining whether there is sufficient contrast in the text-based image. Such information is inputted to a program associated with the color differential adjustment mechanism. If, for example, the level of contrast does not conform to a specified range, the program will modulate various settings of the image capturing system, e.g., lighting, white balance, and color differential to enhance the image. These adjustments, along with other changes to all the other operational settings described above, such as adjusting shutters, aperture, lens tilt, etc., prepare the environment around and on the object for imaging. One feature of the present invention is to initiate image recapture automatically following adjustments to the environment. Recapture may also be executed manually by the user after the imaging subsystem issues other visual or auditory prompts to the user.

In some embodiments, the imaging subsystem further includes CMOS image sensor cells. To facilitate users with unsteady hands and avoid image distortion, handheld embodiments further include an image stabilization mechanism, known by those of ordinary skill in the art.

Additional Features

The system can include a user interface comprising a number of components such as volume control, speakers, headphone/headset jack, microphone, and display. The display may be a monochromatic or color display. In some embodiments, an LCD display having a minimum of 640×480 resolution is employed. The LCD display may also be a touch screen display. According to certain embodiments, the user interface includes a voice command interface by which the user can input simple system commands to the system. In alternative embodiments, the system includes a Braille display to accommodate visually impaired users. In still other embodiments, the Braille display is a peripheral device in the system.

Certain embodiments further include a data port for data transfer, such as transfer of images, from the system to a computing station. Suitable means known in the art for data transfer can be used for this purpose. In one embodiment, the data port is a USB2.0 slot for wired communication with devices. Some embodiments may be wirelessly-enabled with 802.11 a/b/g/n (Wi-Fi) standards. In another embodiment, an infrared (IR) port is employed for transferring image data to a computing station. Still another embodiment includes a separate USB cradle that functions as a battery charging mechanism and/or a data transfer mechanism. Still other embodiments employ Bluetooth radio frequency or a derivative of Ultra Wide Band for data transfer.

Another aspect of the invention provides a handheld device comprising a housing, image capturing system, memory, processor, an OCR system, and text reader system. Illustrations of an exemplary embodiment are provided in FIG. 2 and FIG. 3. Due to the additional components included in these embodiments, the memory requirements are greater than embodiments that lack an integrated OCR system and integrated text reader system. Those of skill in the art will recognize that certain elements described above can also be incorporated into the handheld device.

Figure 2B:
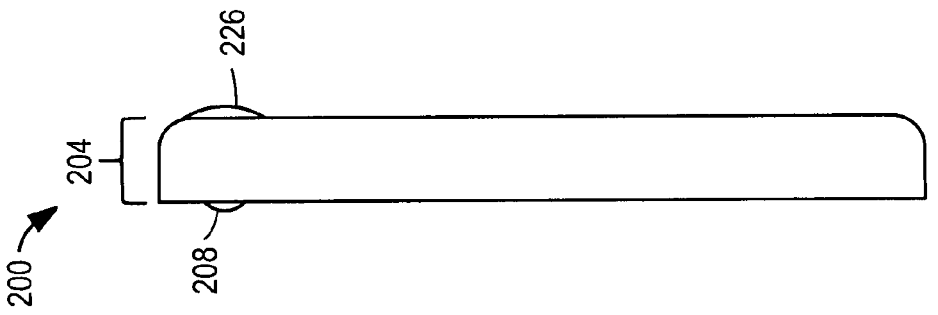
FIGS. 2A and 2B illustrates a front view and a side view of an exemplary handheld embodiment of the invention.
Figure 2A:
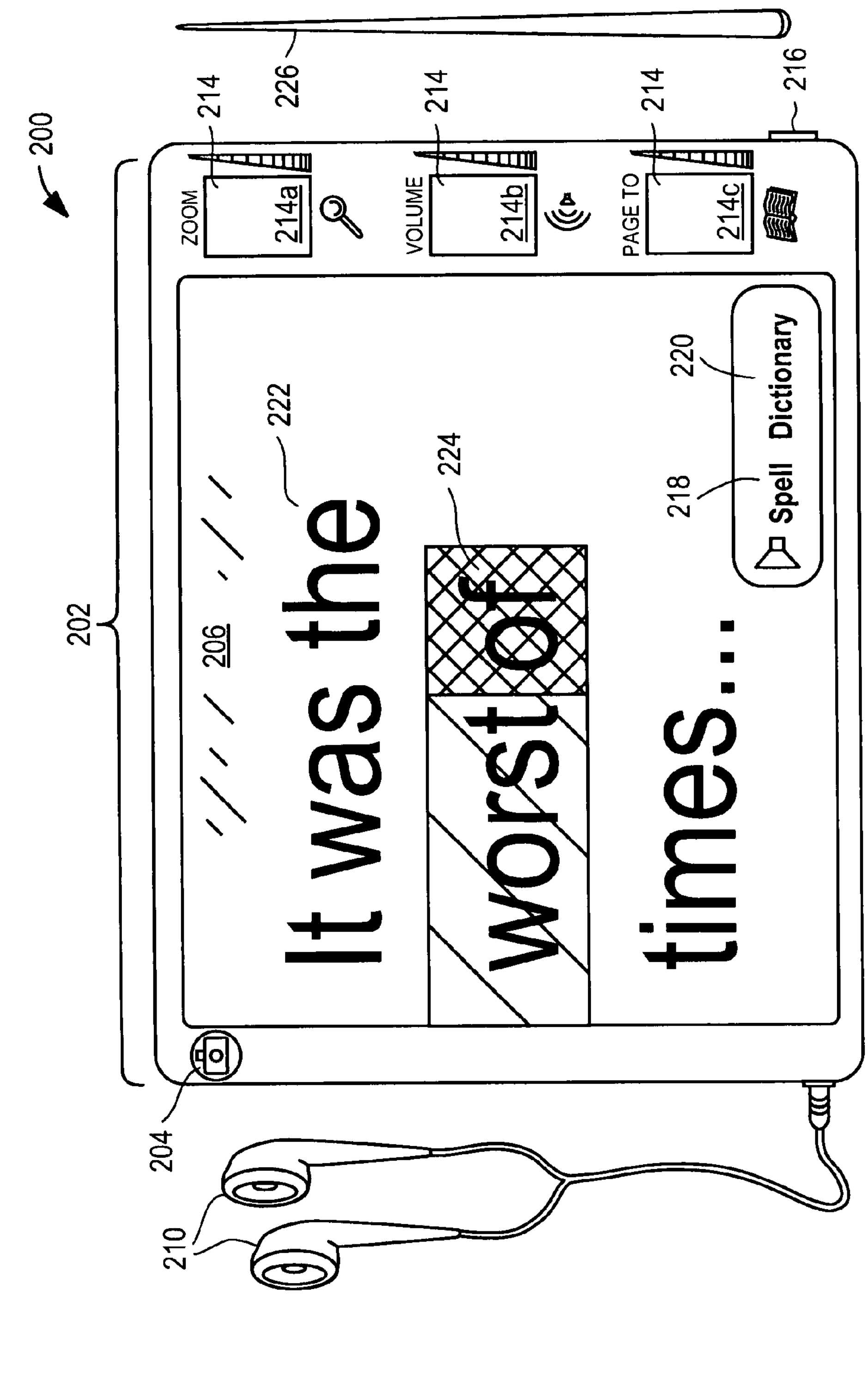

FIGS. 2A and 2B illustrate a front view 202 and a side view 204 of an exemplary handheld embodiment 200 of the invention. FIG. 2 shows a touch screen 206, an image capture mechanism 208, ear piece 210, lens 212, touch sliders 214 such as a zoom control 214*a*, a volume control 214*b*, a page turner 214*c*, a battery power slot 216, a spell check interface 218, a dictionary interface 220, and stylus 226. Touch screen 206 shows a display 222 of the digital text. The highlighted text 224 indicates the text is being read out loud to the user.

Figure 3A:
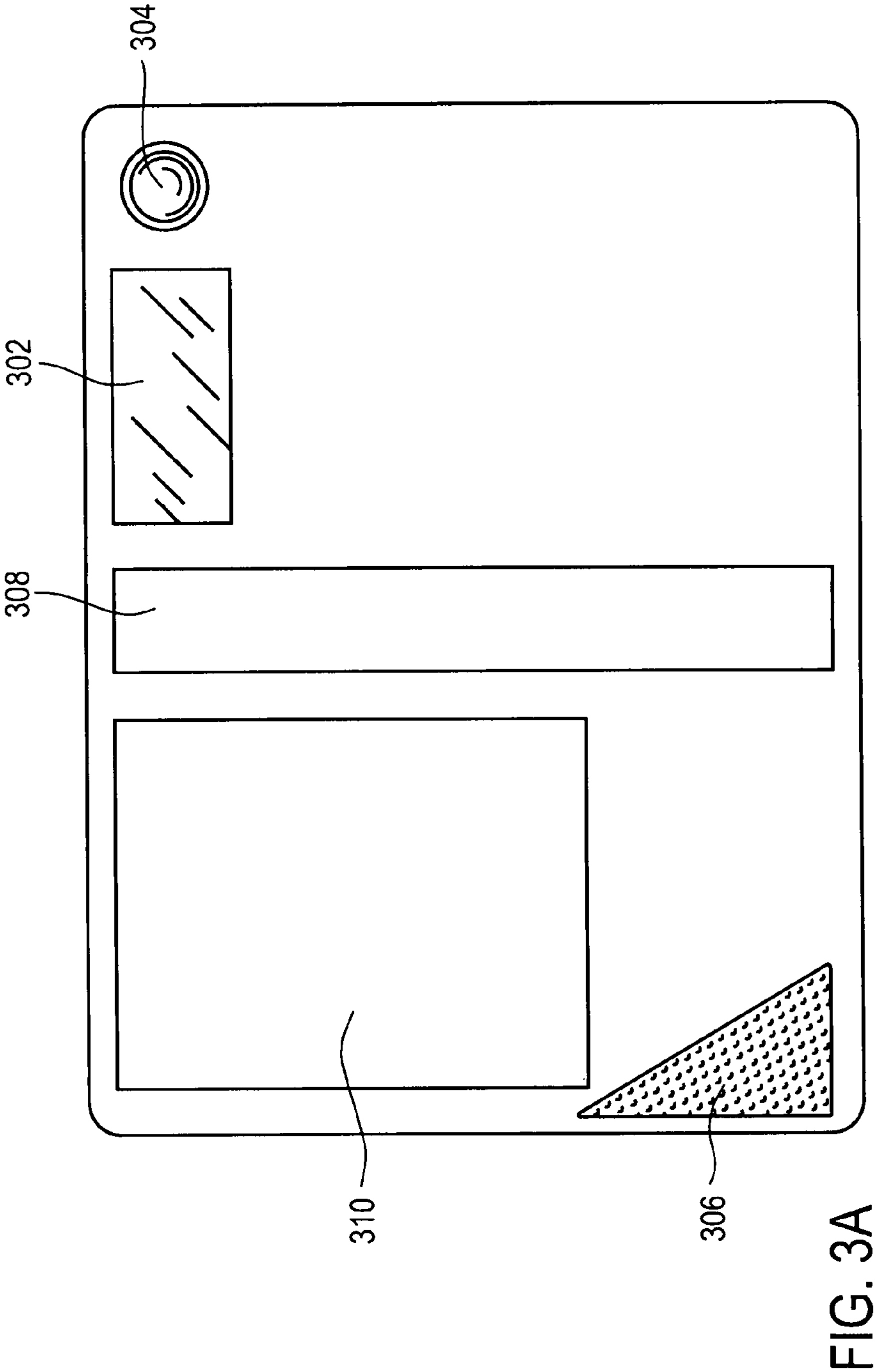
FIGS. 3A and 3B illustrate a rear view and a top view of the device illustrated in FIGS. 2A and 2B.
Figure 3B:
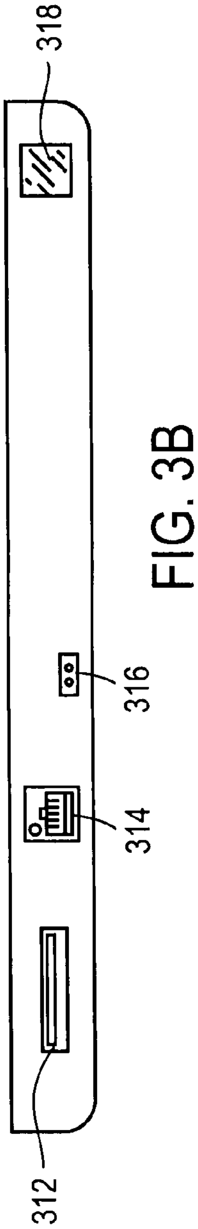

FIGS. 3A and 3B is a rear view and a top view of the handheld device illustrated in FIGS. 2A and 2B. FIG. 3A shows a light source 302, a lens 304 with adjustable focal length, a speaker 306, an extendable arm 308 for propping up the handheld device, and a battery slot 310. FIG. 3B depicts a USB data port 312, an IP port 314, a USB camera port 316, and an infrared (IR) port 318.

OCR systems and text reader systems are well-known and available in the art. Examples of OCR systems include, without limitation, FineReader (ABBYY), OmniPage (Scansoft), Envision (Adlibsoftware), Cuneiform, PageGenie, Recognita, Presto, TextBridge, amongst many others. Examples of text reader systems include, without limitation, Kurzwell 1000 and 3000, Microsoft Word, JAWS, eReader, WriteOutloud, ZoomText, Proloquo, WYNN, Window-Eyes, and Hal. In some embodiments, the text reader system employed conforms with the DAISY (Digital Accessible Information System) standard.

In some embodiments, the handheld device includes at least one gigabyte of FLASH memory storage and an embedded computing power of 650 mega Hertz or more to accommodate storage of various software components described herein, e.g., plane detection mechanism, image conditioners or filters to improve image quality, contrast, and color, etc. The device may further include in its memory a dictionary of words, one or more translation programs and their associated databases of words and commands, a spellchecker, and thesaurus. Similarly, the handheld device may employ expanded vocabulary lists to increase the accuracy of OCR with technical language from a specific field, e.g., Latin phrases for the practice of law or medicine or technical vocabularies for engineering or scientific work. The augmentation of the OCR function in such a manner to recognize esoteric or industry-specific words and phases and to account for the context of specialized documents increases the accuracy of the OCR operation.

In still other embodiments, the handheld device includes a software component that displays the digital text on an LCD display and highlights the words in the text as they are read aloud. For example, U.S. Pat. No. 6,324,511, the disclosure of which is incorporated by reference herein, describes the rendering of synthesized speech signals audible with the synchronous display of the highlighted text.

The handheld device may further comprise a software component that signals to the user when the end of a page is near or signals the approximate location on the page as the text is being read. Such signals may be visual, audio, or tactile. For example, audio cues can be provided to the user in the form of a series of beeps or the sounding of different notes on a scale.

The handheld device may further include a digital/video magnifier, as is known in the art. Examples of digital magnifiers available in the art include Opal, Adobe, Quicklook, and Amigo. In certain embodiments, the digital/video magnifier transfers the enlarged image of the text as supplementary inputs to the OCR system along with the image(s) obtained from the image capturing system. In other embodiments, the magnifier functions as a separate unit from the rest of the device and serves only to display the enlarged text to the user.

Another aspect of the invention provides standalone automated devices comprising a housing, automatic page turner, page holder, image capturing system, memory, a processor, an OCR system, and a text reader system. Such a device can be a complete standalone device with no detachable image/reading device or docking station for a mobile version of the device outlined above to facilitate automatic print digitization from a book or other printed material. Illustrations of certain embodiment are provided in FIGS. 4A, 4B, 5A, SB, and 5C. Those of skill in the art will recognize that certain elements previously described herein can also be incorporated into the standalone device.

Figure 4A:
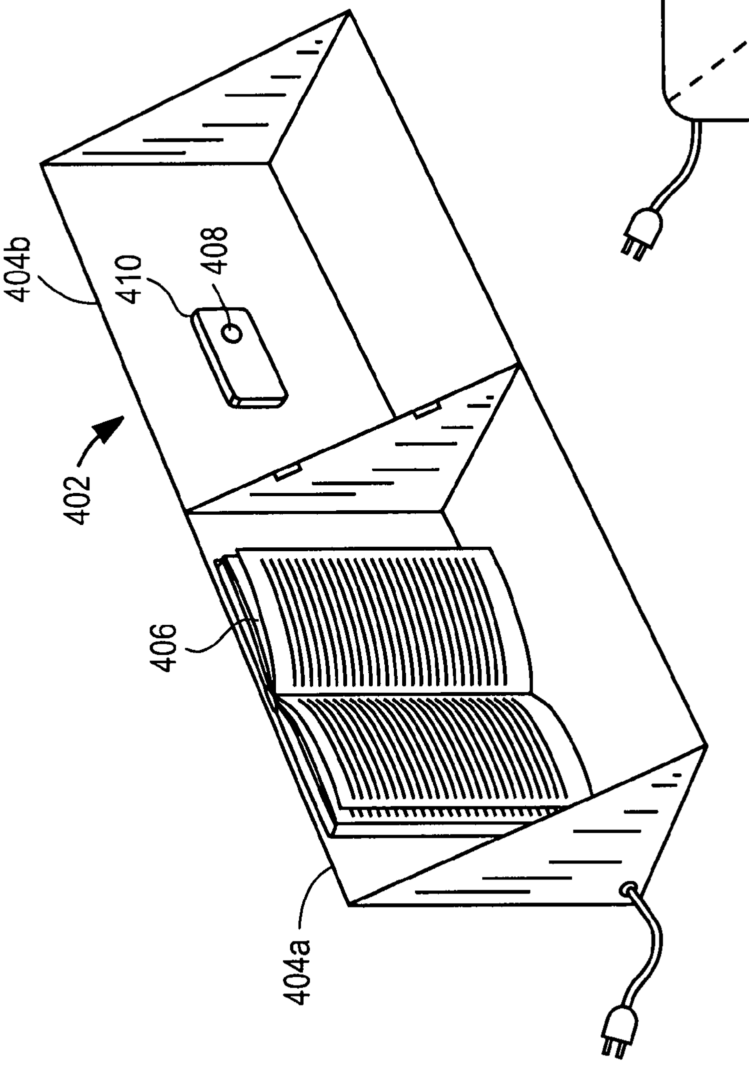
FIGS. 4A and 4B provide an isometric view of an exemplary standalone embodiment in an open configuration and a top view of the standalone embodiment in a closed configuration.
Figure 4B:
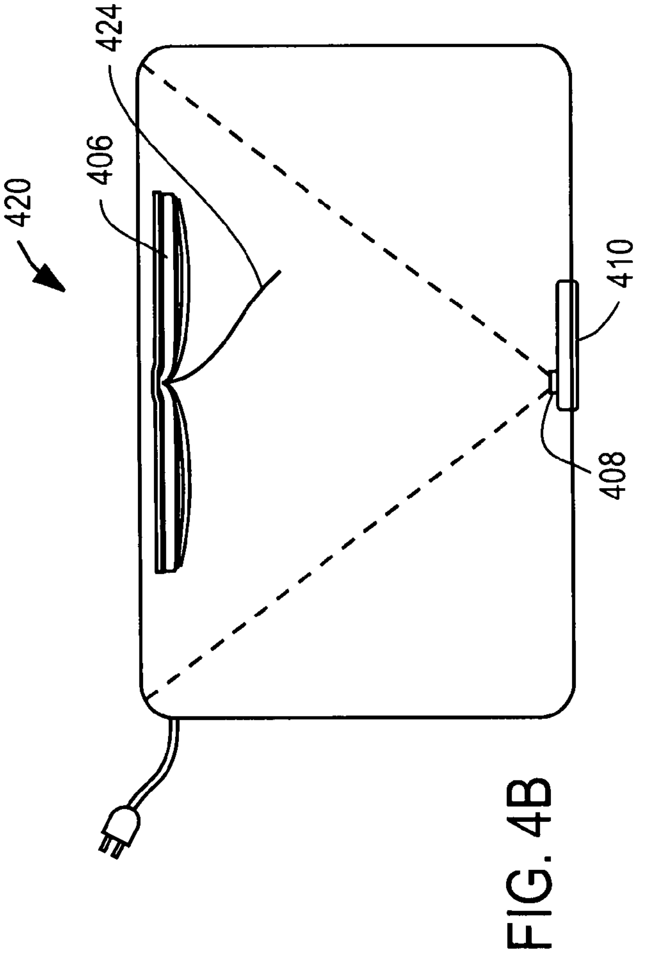

FIG. 4A provides an isometric view 402 of an exemplary standalone embodiment in an open configuration. FIG. 4B depicts a top view 420 of the standalone exemplary embodiment in a closed configuration. Isometric view 402 of the standalone embodiment in the open configuration shows the two halves 404*a*, 404*b* of the housing, a camera lens 408, and a reading device 410. The housing for the standalone device is configured to allow a book 406, to be positioned therein.

Top view 420 of the standalone device in a closed configuration shows that camera lens 408 is positioned to obtain an image of page 424 of book 406. An automatic page, turner (not shown in FIGS. 4A or 4B) can be provided to turn pages of book 406.

Figure 5A:
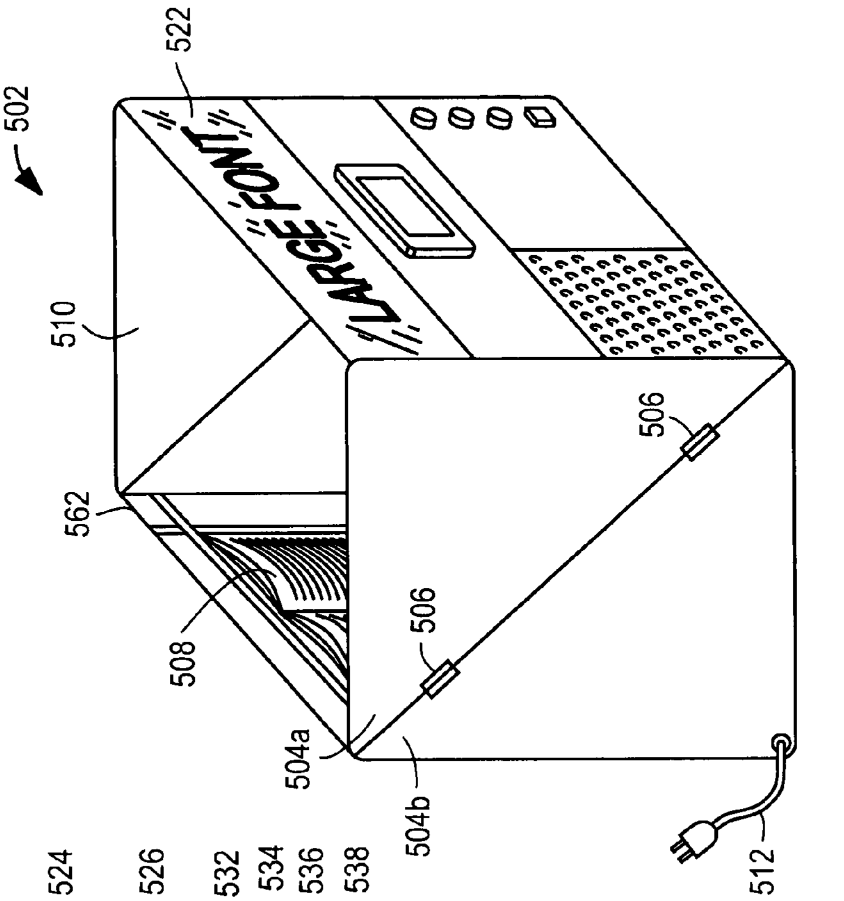
FIGS. 5A, 5B, and 5C provide a side view of the standalone embodiment illustrated in FIGS. 4A and 4B with an enlarged view of the exterior front panel and an enlarged view of the interior back panel.
Figure 5B:
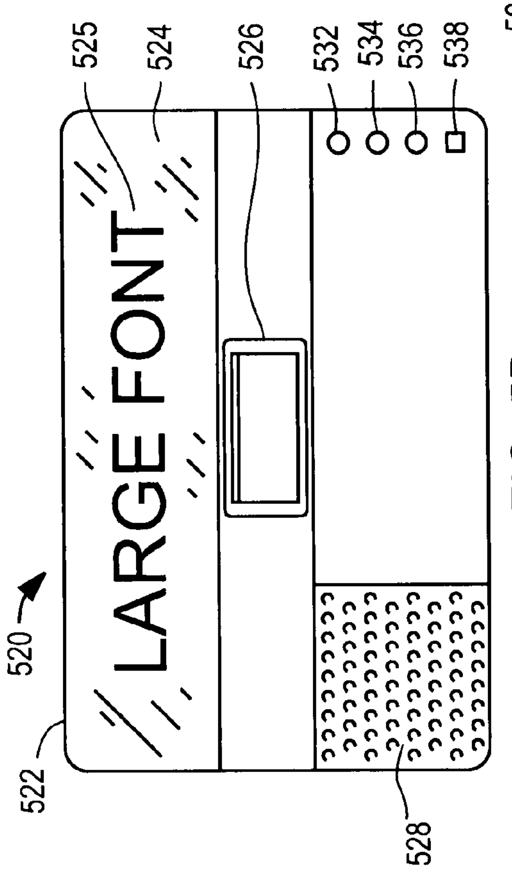
Figure 5C:
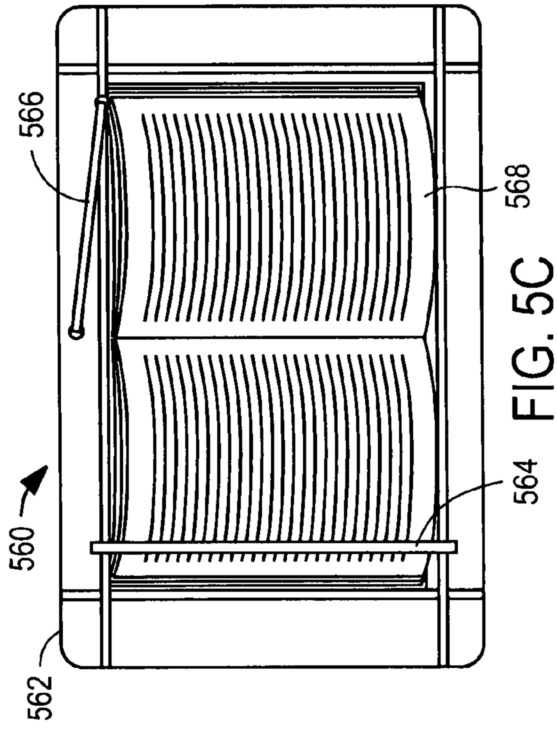

FIG. 5A provides a side view 502 of the standalone exemplary embodiment illustrated in FIG. 4, while FIG. 5B depicts an enlarged view 520 of exterior front panel 522, and FIG. 5C depicts an enlarged view 560 of interior back panel 562. Side view 502 shows the device in a closed configuration with the two halves 504*a*, 504*b* of the housing hinged together by hinges 506, a front panel 522, a back panel 562, a book 508 positioned in the device against the interior of back panel 562, and a power cord 512. Top portion 510 of the housing can be of a transparent material such as clear plastic to allow viewing of the interior.

Enlarged view 520 in FIG. 5B shows that exterior front panel 522 includes a display screen 524 for displaying text 525, a reading device 526, volume control 532, a rate of speech control 534, a font size control 536, an On/Off button 538, and a speaker 528. Enlarged view 560 in FIG. 5C of interior back panel 562 shows arms 564 for holding book pages 568 in place, and an automatic page turning arm 566 for turning pages 568.

The automatic page turner and page holder are respectively coupled to the housing and the image capturing system positioned opposite the slot where the book is to be placed. Automatic page turners are well known and available in the art. See U.S. 20050145097, U.S. 20050120601, SureTurn™ Advanced Page Turning Technology (Kirtas Technologies), the disclosures of which are incorporated herein by reference in their entirety.

In addition, the device can be employed without an automated page turner, instead, relying on the user to turn pages of a book. An example of such a device is illustrated in FIGS. 8A, 8B, and 8C, which illustrate schematics of an alternative exemplary standalone embodiment.

Figure 8C:
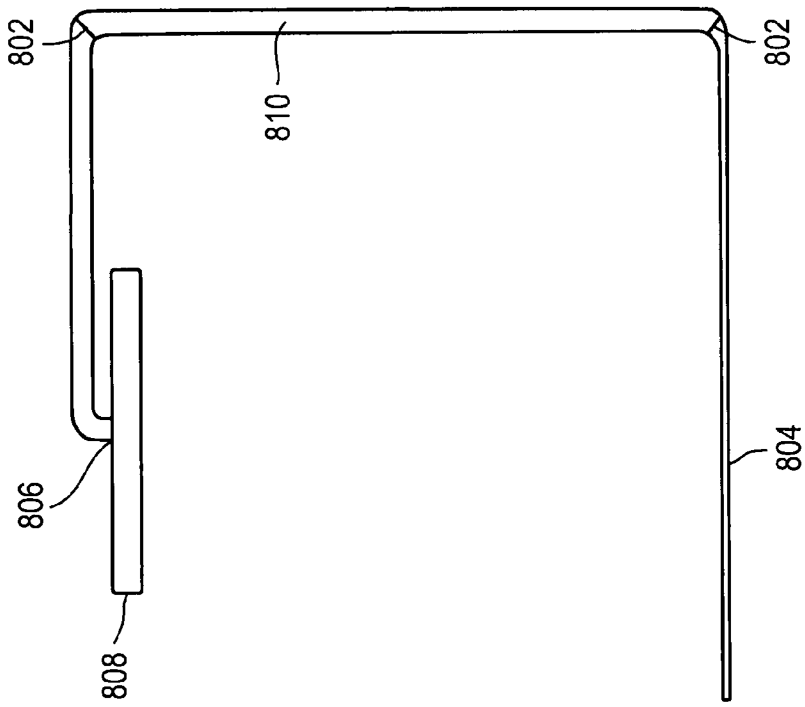
FIGS. 8A, 8B, and 8C illustrate schematics of an exemplary standalone embodiment.
Figure 8A:
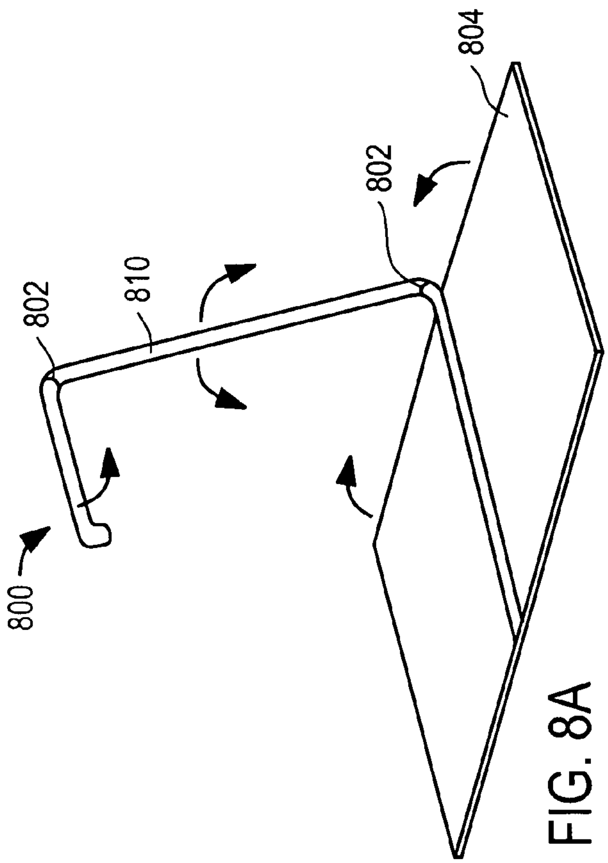
Figure 8B:
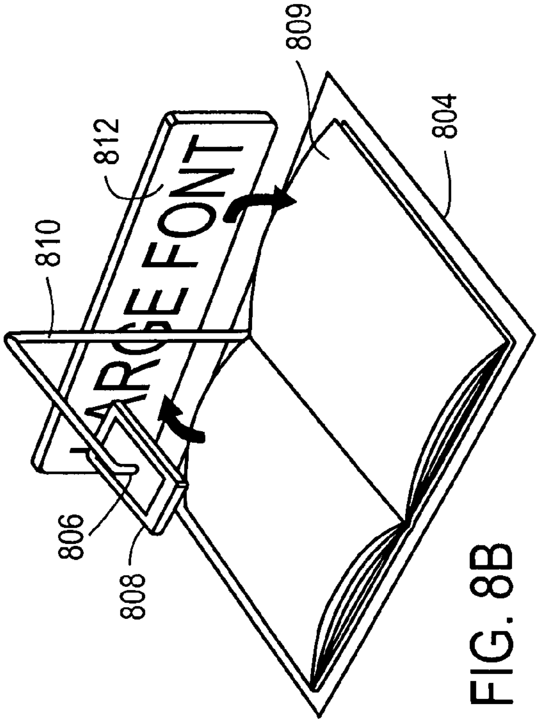

FIGS. 8A, 8B, and 8C show a portable standalone system 800 comprising a collapsible arm 810 and a foldable book plate 804. Collapsible arm 810 has a docking mechanism 806, hinges 802 and is attached to foldable book plate 804. A portable imaging device 808 can be docked using docking mechanism 806. The collapsible arm and book frame allows for the imaging device to be placed at an optimal distance from a book or other object for image capture by the device. System 800 includes modules for OCR processing and for converting the digital text to speech. In certain embodiments, the system 800 includes a mechanism for determining whether a page has been turned by comparing the text from the two pages or by responding to a manual input from the user engaging the digital shutter. Some embodiments include a display screen 812 for displaying the digital text. In yet other embodiments, a Braille machine is included for outputting the digital text.

The publications discussed herein are provided solely for their disclosure prior to the filing date of the present application. Nothing herein is to be construed as an admission that the present invention is not entitled to antedate such publication by virtue of prior invention.

Unless defined otherwise, all technical and scientific terms used herein have the same meaning as commonly understood by one of ordinary skill in the art to which this invention belongs. All publications mentioned herein are incorporated herein by reference in their entirety to disclose and describe the methods and/or materials in connection with which the publications are cited.

The foregoing description, for purpose of explanation, has been described with reference to specific embodiments. The illustrative discussions above are, however, not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A handheld apparatus for capturing text found on an object, he handheld apparatus comprising:

an image capture subsystem including a video camera configured to capture a plurality of images to form a video stream, and configured to generate a master image from the video stream, wherein the video camera has one or more Bragg lenses;

a level detector configured to determine whether the handheld apparatus is level to a surface of object;

an indicator configured to signal when the handheld apparatus appropriate angle to the surface of the object; and an OCR component configured to create a digital text from the master image.

2. The handheld apparatus of claim 1, further comprising a data module configured to manage the digital text for subsequent access.

3. The handheld apparatus of claim 1, wherein the image capture subsystem further includes at least one automatically adjustable lens that tilts within the apparatus so the automatically adjustable lens is level with the surface of the object.

4. The handheld apparatus of claim 1, wherein the video camera includes at least one Macro lens.

5. The handheld apparatus of claim 1, further comprising a page lighting component configured to define a zone of light and a zone of shadow on the object to guide relative object placement.

6. The handheld apparatus of claim 1, further comprising a text reader system configured to convert the digital text into at least one of a plurality of output formats.

7. The handheld apparatus of claim 6, wherein the text reader system is further configured to translate the digital text.

8. The handheld apparatus of claim 7, wherein at least one of the plurality of output formats is a language different than the text found on the object.

9. The handheld apparatus of claim 6, wherein the plurality of output formats is selected from the group consisting of speech, Braille, and displaying in large print text.

10. The handheld apparatus of claim 6, wherein the text reader system is further configured to display a first output format and emit a second output format as speech.

11. The handheld apparatus of claim 10, wherein the text reader system is further configured to synchronize the first output format with the second output format.

12. The handheld apparatus of claim 11, wherein the text reader system is further configured to emphasize text of the first output format as corresponding text in the second output format is spoken.

13. The handheld apparatus of claim 6, wherein the text reader system conforms with the DAISY (Digital Accessible Information System) standard.

14. The handheld apparatus of claim 1, wherein the handheld apparatus includes a touchscreen.

15. The handheld apparatus of claim 1, further comprising a data port for data transfer.

16. The handheld apparatus of claim 1, further comprising a memory.

17. The handheld apparatus of claim 16, wherein the memory is configured to store at least one of the group consisting of a dictionary, a thesaurus, a spellchecker program, and a vocabulary list.

18. The handheld apparatus of claim 16, wherein the memory is configured to store a plurality of tagged information from the digital text.

19. The handheld apparatus of claim 18, wherein the memory is configured to permit searches of the plurality of tagged information.

20. The handheld apparatus of claim 1, wherein handheld apparatus is configured to be mounted to and removed from a standalone system including a docking mechanism configured to receive the handheld apparatus.

21. The handheld apparatus of claim 1, further comprising a material context component configured to associate a media type with the text found on the object.

22. The handheld apparatus of claim 21, wherein the material context component is further configured to associate a layout format with the media type.

23. The handheld apparatus of claim 22, wherein the material context component is further configured to evaluate the media type and layout format to determine the layout of text found on the object.

24. A method for capturing text found on an object comprising:

determining the relative angle between the surface of the object and an imaging system;

signaling if the relative angle between the surface of the object and the imaging system is inappropriate;

capturing a plurality of images of the object with a video camera including one or Bragg lenses;

forming a video stream from the plurality of images;

generating a master image from the video stream; and processing the master image to form a digital text.

25. The method of claim 24, further comprising tilting at least one automatically adjustable lens to keep the automatically adjustable lens level with the surface of the object.

26. A method for capturing text found on an object comprising:

determining the relative angle between the surface of the object and an imaging system;

after determining the relative angle, signaling if the relative angle between the surface of the object and the imaging system is inappropriate;

tilting at least one automatically adjustable lens to keep the automatically adjustable lens level with the surface of the object;

after signaling if the relative angle is inappropriate, capturing a plurality of images of the object with a video camera that includes one or more Bragg lenses;

forming a video stream from the plurality of images;

generating a master image from the video stream; and processing the master image to form a digital text.

27. The method of claim 26, further comprising laying down a light and shadow image on the object to guide placement of the object relative to the imaging system.

* * * * *